United States Patent [19]

Janssens

[11] Patent Number: 4,947,032
[45] Date of Patent: Aug. 7, 1990

[54] DETECTION CIRCUIT FOR A LIGHT-SENSITIVE ELEMENT WHICH IS SUBSTANTIALLY INSUSCEPTIBLE TO AMBIENT LIGHT LEVEL

[75] Inventor: Abraham Janssens, Breda, Netherlands

[73] Assignee: U.S. Philips Corp., New York, N.Y.

[21] Appl. No.: 334,962

[22] Filed: Apr. 7, 1989

[30] Foreign Application Priority Data

Apr. 13, 1988 [NL] Netherlands ..................... 8800954

[51] Int. Cl.$^5$ ............................................. H01J 40/14
[52] U.S. Cl. ................................. 250/214 B; 250/208.1
[58] Field of Search ............ 250/214 B, 214 P, 214 R, 250/214 SW, 214 SF, 214 RC, 214 L, 214 C, 209, 208, 214 A, 214 AG, 214 AL; 307/311

[56] References Cited

U.S. PATENT DOCUMENTS 3,576,452  4/1971  Smith ................................ 250/214
4,355,237  10/1982  Harris ................................ 250/551

Primary Examiner—David C. Nelms
Assistant Examiner—George C. Beck
Attorney, Agent, or Firm—William L. Botjer

[57] ABSTRACT

The invention relates to a circuit for a light-sensitive element (1), for example an infrared diode. The anode (a) of the light-sensitive element is coupled to a point of constant potential (earth). The cathode (c) of the light-sensitive element (1) is coupled to the collector of a pnp transistor (7) and, via a resistor (3), to the base of this transistor. The emitter of the transistor is coupled to a second point (6) of constant potential (+). The base is also coupled to this point (6) via a series arrangement of a resistor (5) and a capacitor (4). The desired sensitivity of the circuit is maintained even in the case of a high background light level.

5 Claims, 1 Drawing Sheet

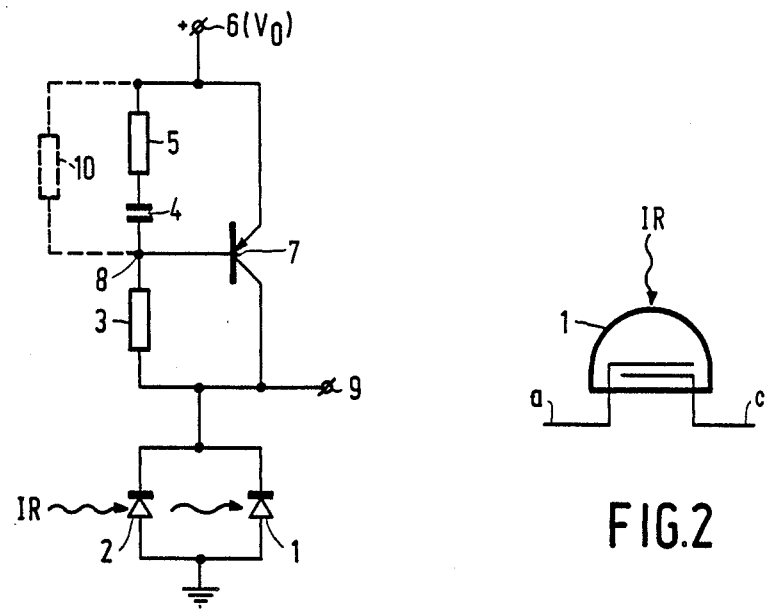

DETECTION CIRCUIT FOR A LIGHT-SENSITIVE ELEMENT WHICH IS SUBSTANTIALLY INSUSCEPTIBLE TO AMBIENT LIGHT LEVEL

BACKGROUND OF THE INVENTION

The invention relates to a circuit for a lightsensitive element, comprising a resistor arranged in series with the light-sensitive element between a first and a second point of constant potential.

Such a circuit is known and is used in an infrared receiver. The known circuit has the disadvantage that the infrared receiver no longer operates correctly at a high ambient light level.

SUMMARY OF THE INVENTION

It is an object of the invention to provide a circuit which is (substantially) insusceptible to the ambient light level and which also performs satisfactorily at high ambient light levels. To this end the circuit in accordance with the invention is characterized in that the circuit further comprises a transistor and a series arrangement of a second resistor and a capacitor, in that the end of the first-mentioned resistor which is not conected to the light-sensitive element is coupled to the first point of constant potential via the series arrangement of the second resistor and the capacitor and is coupled to a control electrode of the transistor, and in that the transistor has a first main electrode coupled to the first point of constant potential and has a second main electrode coupled to the node between the first resistor and the light-sensitive element.

The invention is based on the recognition of the following fact. In the known circuit the series arrangement of the first resistor and the light-sensitive element is arranged directly between the two points of constant potential. High ambient light levels give rise to a large direct current through the series arrangement. This current produces a large voltage drop across the first resistor, so that there is (substantially) no voltage across the light-sensitive element. This means that information transmission is (substantially) impossible. Moreover, the signal on the node between the first resistor and the light-sensitive element is highly distorted. Said node constitutes the output terminal of the circuit, which output terminal can be coupled to a preamplifier of the receiver. The distortion also gives rise to a substantial crosstalk between the various signal channels, which are for example frequency-modulated for transmission via the infrared transmission path.

If in accordance with the invention a transistor and the series arrangement of the second resistor and the capacitor are added it is achieved that the direct current through the light-sensitive element, which current is caused by the prevailing background light level, is drained via the transistor and that the direct voltage on the node between the first resistor and the light-sensitive element does not change (significantly). Consequently, the direct voltage does not give rise to an additional voltage drop on said node, so that the light-sensitive element will also operate correctly in the case of a high ambient light level. Moreover, the sensitivity of the circuit in accordance with the invention is higher and the circuit is more immune to noise.

If the light-sensitive element is constructed as an infrared diode, the anode of the infrared diode is preferably coupled to the second point of constant potential. This ensures that high-frequency ambient light cannot give rise to a spurious component in the detected signal.

It is possible to arrange at least a second lightsensitive element in parallel with the light-sensitive element. This provides a higher sensitivity of the detection of the (infrared) light signal.

In order to increase the output-voltage swing of the circuit a third resistor may be arranged in parallel with the series arrangement of the second resistor and the capacitor.

The invention will now be described in more detail, by way of example, with reference to the accompanying drawing. In the drawing:

BRIEF DESCRIPTION OF THE DRAWING

FIG. 1 shows an embodiment of the circuit, and
FIG. 2 shows the light-sensitive element.

DETAILED DESCRIPTION OF THE PREFERRED EMBODIMENT

FIG. 1 shows a circuit for a light-sensitive element 1, for example an infrared diode. In the present embodiment the circuit comprises two infrared diodes 1 and 2 arranged in parallel in order to improve the sensitivity. The anodes of the two diodes 1 and 2 are connected to a point of constant potential (earth). The cathodes of the two diodes 1 and 2 are both coupled to another point 6 of constant potential (+) via a series arrangement of a first resistor 3, a capacitor 4 and a second resistor 5. The capacitor 4 and the second resistor 5 may also be interchanged.

The cathodes of the two diodes 1 and 2 are also coupled to point 6 via a pnp transistor 7. The transistor 7 has its base coupled to the node 8 between the resistor 3 and the capacitor 4.

The node between the diodes and the resistor 3 together with the collector of the transistor 7 is coupled to the output terminal 9 of the circuit. The emitter of the transistor 7 is coupled to point 6. The output terminal 9 can be coupled to a preamplifier for further amplification of the detected signal appearing on point 9.

The circuit operates as follows. The direct voltage on point 9 is constant regardless of the (steady) ambient-light level and is substantially equal to $V_0$ (which is the direct voltage level on point 6) minus $V_{be}$ (which is the voltage across the base-emitter junction of the transistor 7).

This is achieved in that the direct current generated by the diodes under the influence of the ambient light is drained via the transistor 7. This is because the d.c. input impedance at point 9 of the circuit is low.

By adding a resistor 10 in parallel with the series arrangement of the capacitor 4 and the resistor 5 the base voltage, i.e. the direct voltage on point 8, of the transistor 7 can be changed. This results in the direct voltage on point 9 being changed, enabling the the outputvoltage swing to be altered (extended). This may be necessary, for example, if the modulation amplitude of the received light signal is larger.

The resistor 3 provides negative feedback from the collector to the base of the transistor 7 in order to minimize the noise appearing on point 9 as a result of the noise in the PN junction of the transistor 7. Moreover, the transfer of the receiver circuit, i.e. the transfer of the variations in light intensity detected by the lightsensitive element to the voltage variations on point 9, now has a more linear characteristic.

The modulated (infrared) light signal IR received by the light-sensitive element(s) causes the current in the elements 1 and 2 to vary. These current variations give rise to voltage variations on point 9 because, viewed from point 9, the input impedance of the circuit comprising the transistor 7, the two resistors 3 and 5 and the capacitors is high for high-frequency variations.

In the case of a higher background light level the elements 1 and 2 will supply a larger quiescent current. However, this quiescent current is drained via the transistor 7 because said input impedance is low for direct current. Consequently, this direct current will not lead to a change in the d.c. setting at point 9. In this way the output-voltage swing and hence the sensitivity of the circuit will not be affected in the case of higher background light levels.

FIG. 2 shows the light-sensitive element 1. The element comprises two electrodes, an anode a and a cathode c. The anode a is the first of the two electrodes, viewed from the direction of incidence of the infrared light IR. Preferably, this electrode is coupled to a point of constant potential, as is illustrated in FIG. 1. The element is then more immune to undesirable high-frequency radiation, which may cause spurious components in the output current of the light-sensitive element.

This may occur in a circuit in which the cathodes of the light-sensitive elements are connected to the terminal 6 and the anodes are connected to earth via an npn transistor and via a series arrangement of the first resistor, the capacitor and the second resistor.

It is to be noted that the scope of the invention is not limited to the circuits described in the foregoing. The invention also relates to those embodiments which differ from the above embodiments in respects which are not relevant to the invention.

I claim:

1. A circuit for a light-sensitive element, comprising a first resistor arranged in series with the light-sensitive element between a first and a second point of constant potential, wherein the circuit further includes a transistor and a series arrangement of a second resistor and a capacitor, in that the end of the first resistor which is not connected to the light-sensitive element is coupled to the first point of constant potential via the series arrangement of the second resistor and the capacitor and the end of the first resistor which is not connected to the light sensitive element is also coupled to a control electrode of the transistor, and in that the transistor has a first main electrode coupled to the first point of constant potential and has a second main electrode coupled to the node between the first resistor and the light-sensitive element.

2. A circuit as claimed in claim 1, characterized in that the light-sensitive element is an infrared diode.

3. A circuit as claimed in claim 2, characterized in that an anode of the infrared diode is coupled to the second point of constant potential.

4. A circuit as claimed in claim 1 characterized in that at least a second lightsensitive element is arranged in parallel with the lightsensitive element.

5. A circuit as claimed in claim 1 characterized in that a third resistor is arranged in parallel with the series arrangement of the second resistor and the capacitor.

* * * * *